United States Patent Office 3,435,326
Patented Mar. 25, 1969

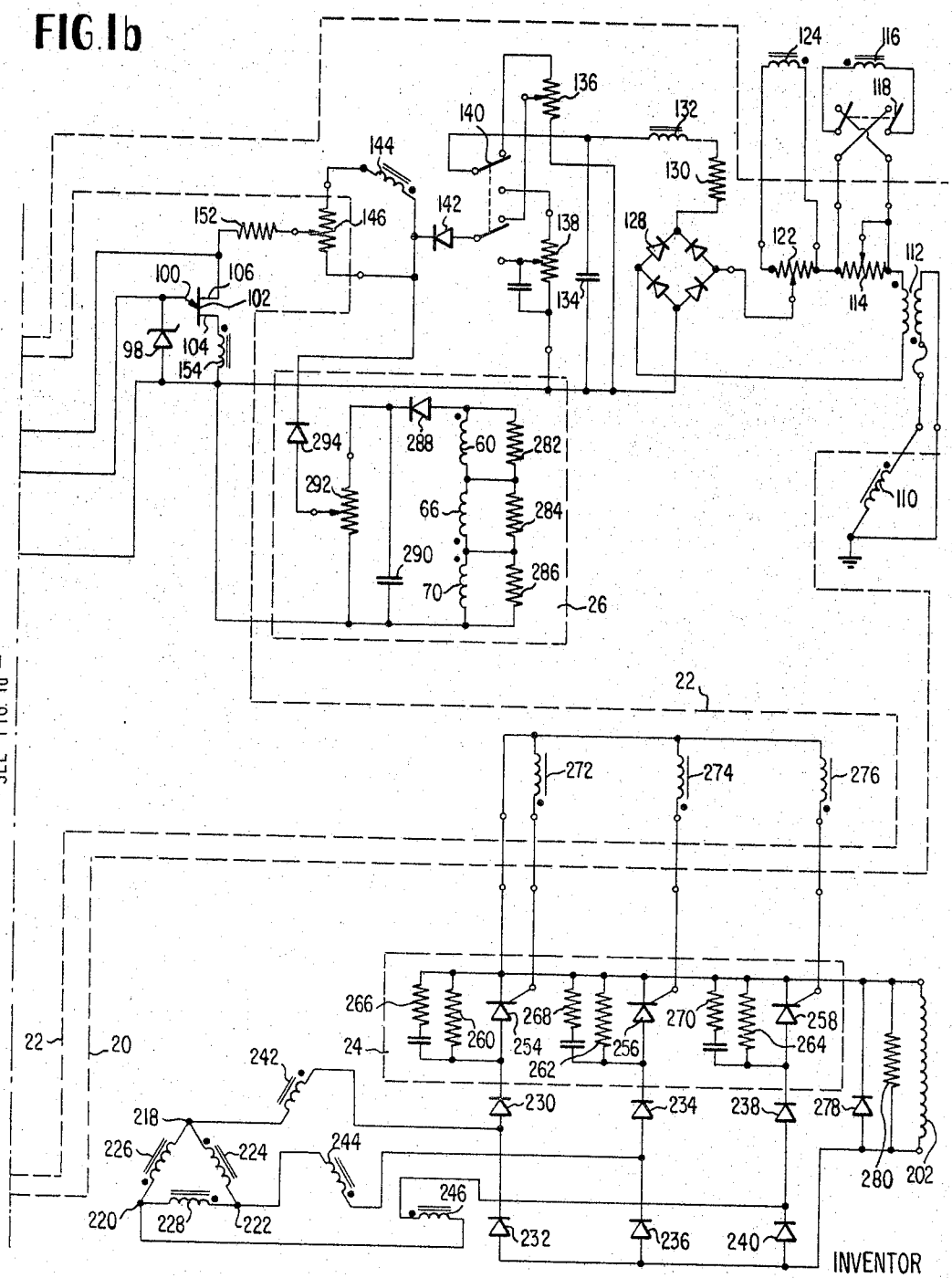

3,435,326
STATIC EXCITER REGULATOR FOR GENERATORS
Richard Zechlin, Beloit, Wis., assignor to Fairbanks Morse Inc., New York, N.Y., a corporation of Delaware
Filed July 8, 1966, Ser. No. 563,907
Int. Cl. H02p 9/10
U.S. Cl. 322—25    12 Claims

ABSTRACT OF THE DISCLOSURE

The static exciter regulator provides generator regulation throughout each operative voltage or current cycle of the generator by employing a firing circuit for advancing or retracting the firing angle of a master switching circuit in response to variations in the generator output. A slave switching circuit triggered by the master causes slave switches to fire at a set phase differential from the master to provide rapid field corrections to the control field of the generator during both voltage and current operating conditions thereof.

---

Figure 1A:
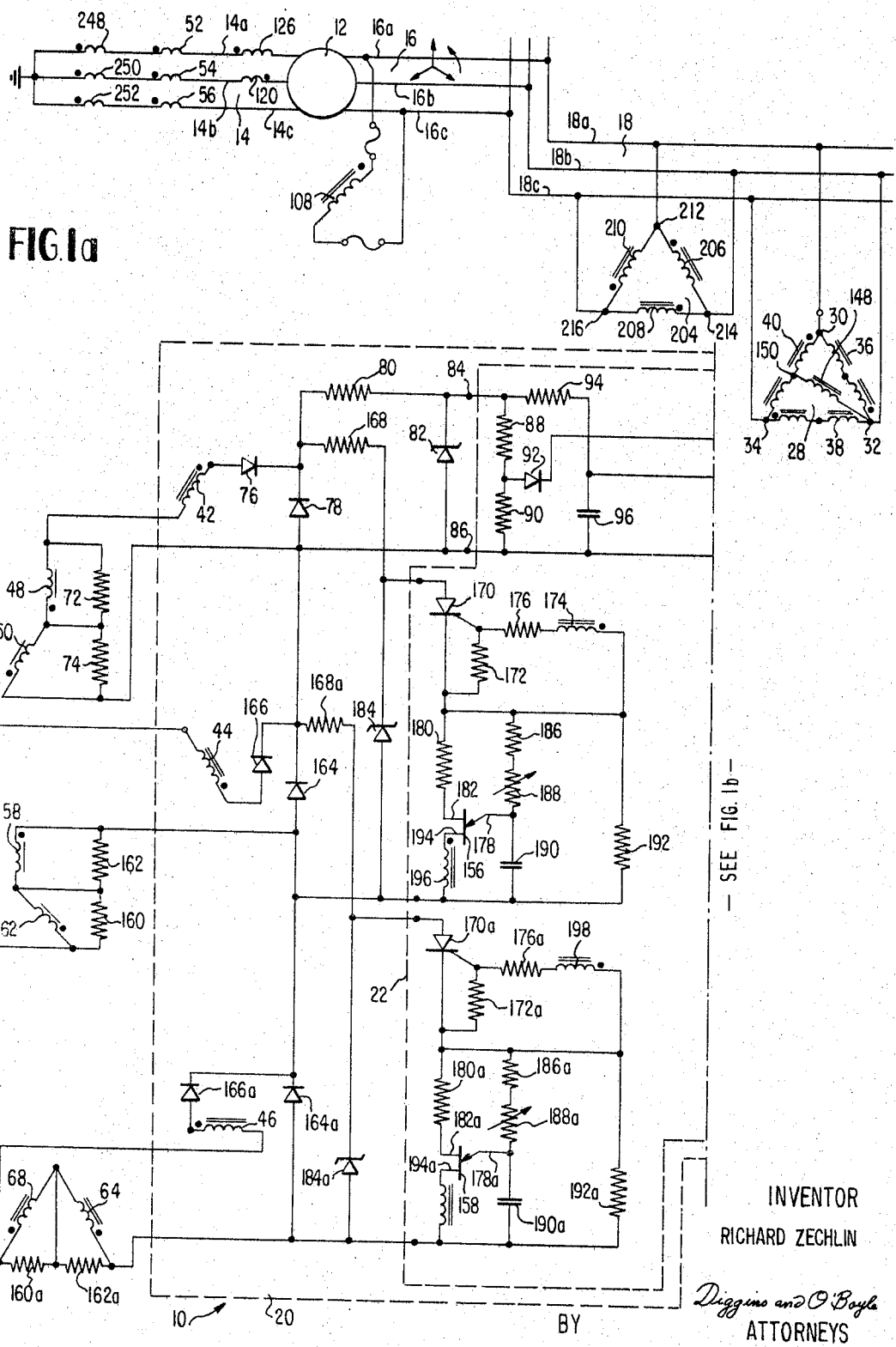

This invention relates to generator regulator systems generally, and more particularly to a novel and improved static exciter regulator for an alternating generator or alternator.

In conventional regulated generator systems, the generator includes an excitation field winding which receives excitation power from a D.C. exciter. This D.C. exciter, in turn, is controlled by a voltage regulator which senses the output voltage of the generator, and operates through the exciter to maintain a nearly constant A.C. output voltage over the load range of the generator.

Conventional generator regulator systems of this type are subject to numerous inherent deficiencies, both mechanical and electrical. Typical deficiencies are problems caused by wear in the rotating exciter, periodic maintenance of brushes and commutators and the electrical problem of time constants, to effect generator field change with change in generator output voltage. Additionally, the regulator systems employed for generator control often include variable resistances or relay switching circuits, both of which are subject to malfunction through mechanical wear and aging.

To combat the high malfunction rate prevalent with conventional generator control systems, recent trends have been toward the development of static exciter control systems. In these systems, the rotating exciter and the electro-mechanical regulating and switching elements previously employed with generator control systems have been replaced by static electrical elements including transistors and silicon controlled rectifiers (SCR's). Also in static systems, generator control field excitation power is normally obtained from the output of the generator by means of current transformers and rectifiers, and this generator output power is then fed through some type of regulator to the control field for the generator. Often, between the regulator and control field, there is provided an SCR switching network to control the excitation of the control field in accordance with the generator output voltage. In many instances, this switching network operates to supply controlled excitation for the generator field control winding only during a fraction of each output cycle of the generator, thereby leaving the generator in an uncontrolled state for the remainder of the output cycle. Additionally, the voltage regulator employed by such static systems must often be capable of carrying power from the output of the generator to energize the control field winding.

Ideally, to achieve enhanced generator control, generator regulation should occur throughout the output voltage cycle of the generator and regulation should occur on each operative cycle. Also, the field excitation power should be derived from a source other than through the voltage regulator for the system, for system control of increased accuracy may be obtained if the regulator provides only an adjusted control signal to determine the degree of field excitation to be accomplished during each output cycle of the generator.

It is a primary object of this invention to provide an improved static exciter regulator for an A.C. generator which is devoid of moving parts.

Another object of the present invention is to provide an improved static exciter regulator for an A.C. generator which measures and corrects the output voltage of the generator on each cycle of said output voltage.

A further object of this invention is to provide an improved static exciter regulator for an A.C. generator which is capable of providing rapid field current corrections to the control field of the generator during both voltage and current operating conditions of the generator.

Another object of this invention is to provide an improved static exciter regulator for an A.C. generator which causes the regulated A.C. output voltage of the generator to have considerable droop with increasing A.C. load current to assure that slight voltage changes will not cause the control field voltage to make extreme excursions with resultant regulator output hunting.

A further object of this invention is to provide an improved static exciter regulator for A.C. generators which includes a built in droop characteristic to prevent extreme excursions in the control field voltage of the generator for slight output voltage change and which includes a linearity current transformer to permit such droop characteristic to be nullified while maintaining for the regulator the inherent stability of regulators operating with considerable droop.

A further object of this invention is to provide an improved static exciter regulator for A.C. generators wherein power taken directly from the electrical output of the generator is converted to a controlled three phase full wave rectified signal for control field excitation of the generator without passing through the voltage regulator.

Another object of this invention is to provide an improved static exciter regulator for A.C. generators having a novel silicon controlled rectifier switching circuit for controlling the three phase full wave rectified excitation signal fed to the generator field control winding.

A further object of this invention is to provide an improved static exciter regulator for A.C. generators having a novel firing circuit for advancing or retracting the firing angle of switching circuit in response to variations in generator output voltage.

Another object of this invention is to provide an improved static exciter regulator for A.C. generators having a novel firing circuit for firing a plurality of silicon controlled rectifiers at a set phase differential during each cycle of the generator output voltage for field excitation control.

A further object of this invention is to provide an improved static exciter regulator for A.C. generators having a voltage regulator which provides an adjusted sense voltage signal from the generator output and reference signals as firing control signals for a silicon controlled rectifier firing circuit.

A still further object of this invention is to provide an improved static exciter regulator for A.C. generators which includes a current regulator operative during current operation of the generator to provide a sense voltage signal indicative of current variations in the input power line for the generator and reference signals as firing control signals for a silicon controlled rectifier firing circuit.

The foregoing and other objects of the invention will become apparent upon a consideration of the following specification and appended claims taken in conjunction with the accompanying drawing. This drawing is a circuit digram of a preferred form of the static exciter regulator system of the present invention applied to a three phase synchronous generator. The circuit diagram is divided into FIGURES 1a and 1b.

Basically, the static exciter-regulator of the present invention is intended to provide accurate control for the excitation field winding of an A.C. generator. This control is achieved through a voltage regulator which senses the output voltage of the generator and provides an accurate control signal to a master firing circuit for an excitation control switching unit. This control signal is formed by comparing an adjusted sense voltage from the output of the generator with a reference voltage generated in the regulator. The sense voltage is adjusted, within the regulator, for linearity and cross current, and is further provided with a superimposed control voltage which provides a positive link in the relationship between the reference voltage, the sense voltage, and the excitation voltage provided to the excitation field winding of the generator.

The very accurate sense and reference voltages developed by the voltage regulator operate a master firing circuit which, in turn, controls the firing angle of a first silicon controlled rectifier (SCR) to permit excitation power to pass to the excitation field winding of the generator. Second and third firing circuits, which constitute slave circuits, are fired in a predetermined phase relationship to the master firing circuit, to operate second and third SCR field supply control switches at predetermined phase differentials. These firing circuits respond to the accurate control signals from the regulator to advance or retract the firing angle of the SCR's in response to variations in the output voltage from the A.C. generator during voltage operation.

During current operation of the generator, when the generator output is shorted or connected to a low impedance load, the master and slave firing circuits are operated in response to a sense voltage developed in a current regulator. This sense voltage varies with variations of the current in the input power line for the machine which is sensed by the current regulator. Also, the reference voltage for the firing circuits is developed from the power input to the machine during current operation.

The SCR switching circuit employed with the static exciter regulator of the present invention provides extremely accurate field excitation control during each cycle of the output voltage of the A.C. generator. This switching circuit employs SCR's to handle the excitation power for the field winding, such SCR's generally having a much higher power rating than normal transistors. The SCR switches employed have an anode, a cathode, and a gate terminal, with the conventional forward direction of conduction being across the SCR from the anode to cathode terminals. Generally, the SCR is a current blocking device and operates to block current flow from the cathode to the anode or from the anode to the cathode. In this state, the SCR is said to be cut-off or off. However, when there is a flow of current initiated from the gate to cathode terminals, the SCR will permit current to flow in the forward direction with substantially no impedance. Even after the gate potential is removed, the SCR will continue to conduct in a forward direction until either the forward potential is removed or a reverse bias is applied to the gate terminal to overcome such forward potential.

Although the switching circuit of the present invention preferably employs SCR switching units, it is contemplated that equivalent units can be employed.

Referring now to the drawing, the static exciter regulator system of the present invention indicated generally at 10 is shown operatively connected to a three phase generator 12 which is connected to a multi-phase input power line 14 having branches 14a, 14b, and 14c. The generator 12 includes a three phase output 16 having branches 16a, 16b, and 16c which are connected to a three phase bus 18 having branch lines 18a, 18b, and 18c. Although the voltage on the bus 18 may be higher than that on the output 16 of the generator, during normal operation, the phase sequence on the bus is 18a–18b–18c while on the generator output the phase sequence is 16a–16b–16c and the bus voltage is in phase with the generator output voltage.

Basically, the static exciter-regulator 10 is formed by a voltage regulator indicated generally at 20 which includes the firing circuit 22 for a SCR switching unit 24. Additionally, the voltage regulator also includes a current limiter or regulating circuit 26.

Considering now in detail the circuit configuration of the voltage regulator 20, it will be noted that control power for the regulator reference signal is provided by a control transformer 28 having delta connected split primary windings extending between terminal points 30, 32 and 34. The terminal point 30 is in turn connected to branch 18a of the bus 18, the terminal point 32 to branch 18b and the terminal point 34 to branch 18c. A split primary winding 36 extends between terminal points 30 and 32, a split primary winding 38 extends between terminal points 32 and 34, and a split primary winding 40 extends between terminal points 30 and 34.

The secondary windings for the control transformer 28 provide the power input for the reference side of the voltage regulator 20, and include a secondary winding 42 for the primary winding 40, a secondary winding 44 for the primary winding 36, and a secondary winding 46 for the primary winding 38.

The primary winding 40 provides power from the bus 18 to the secondary winding 42 during voltage operation of the generator 12, and in instances where control current transformers are employed in the generator circuit to provide control during current operation, these control current transformers are connected in the three phase line 14. The control current transformers include a primary winding 52 connected in the branch 14a, primary winding 54 connected in the branch 14b, and a primary winding 56 connected in the branch 14c. The primary winding 52 is associated with the secondary winding 48, and also with secondary windings 58 and 60, while the primary winding 54 is associated with secondary windings 62, 64, and 66. The primary winding 56 is associated with secondary windings 50, 68, and 70. It will be noted that the secondary windings 60, 66, and 70 are incorporated within the current regulator 26, and perform a function which will be hereinafter described.

The control current transformer secondaries 48 and 50 form a bridge circuit with resistors 72 and 74, and are connected in series with the secondary winding 42, but during voltage operation of the generator, the effect of the current transformer secondaries on the voltage across the secondary winding 42 is negligible.

The output from the secondary winding 42 is half wave rectified by the rectifiers 76 and 78, and the half wave rectified signal is then clipped by the combination of a resistor 80 and a Zener diode 82. The resultant clipped signal might be measured across points 84 and 86, and from points 84 and 86, this signal is developed across resistors 88 and 90 which form a voltage divider to provide anode potential to a diode 92. When the generator 12 is starting and the output voltage thereof is low, the voltage divider and the diode 92 provide source voltage for a base 2 electrode 106 of a unijunction transistor 102. Primarily, however, the signal from points 84 and 86 provides a charging potential across a resistor 94 for a capacitor 96 which, with a shunt limiting Zener diode 98, develops a reference signal to initiate the firing of the unijunction transistor 102. The level to which the capacitor 96 is permitted to charge upon each positive excursion of the secondary winding 42 is determined by the Zener diode 98.

The reference signal developed by the capacitor 96 and the Zener diode 98 provides emitter potential at the emitter 100 of the unijunction transistor 102. The transistor 102 is a standard unijunction transistor having the emitter 102, a base 1 electrode 104 and the base 2 electrode 106.

The reference signal on the emitter of the unijunction transistor is compared with an adjusted sense signal developed by the voltage regulator 20 to provide an accurate control signal for a master firing unit of the firing circuit 22. This sense signal begins with the output voltage from the generator 12 which is sensed by the primary 108 of a line-to-line potential transformer having a secondary winding 110. The primary winding is connected across branches 16a and 16b of the generator output and passes the sensed output voltage to the secondary winding 110. This secondary sense voltage is isolated and stepped down by a step down transformer 112, the output of which is developed across a variable resistor 114 where it is combined with the output from a secondary winding 116 of a cross current transformer. The secondary winding of the cross current transformer may be selectively connected across the variable resistor 114 by a switching unit 118, and the secondary voltage is received from a primary winding 120 which is connected in the input line branch 14b. The primary winding of the cross current transformer is placed in the load line not being sensed by the transformer primary 108.

The cross current transformer constitutes a standard current transformer which is loaded by the variable resistor 114. For unity power factor, the cross current transformer has little effect on the output of the step down transformer 112. However, as the system assumes a lagging power factor, the output of the cross current transformer adds to the output voltage of the step down transformer, thus tending to lower the regulated output voltage of the generator in a manner to be subsequently appreciated. The setting of the variable resistor 114 controls the amount of droop for a given amount of out of phase current.

The cross current compensated voltage from the variable resistor 114 is then adjusted for linearity across a variable resistor 122, which is connected in series with the resistor 114. A secondary winding 124 for a linearity current transformer is connected across the variable resistor 122, and the secondary voltage from this winding provides a summation voltage with the combined sense and cross current voltage to insure good regulation accuracy. A primary winding 126 for the linearity current transformer is connected in the input line branch 14a, and the linearity control provided by this transformer is adjusted by means of the variable resistor 122.

The linearity current transformer is used in conjunction with the regulator 20 so that the built in droop characteristic of the regulator can be nullified while still maintaining an inherent stability for the regulator characteristic of regulators which operate with considerable droop. This may be accomplished by adjusting the variable resistor 122 for proper regulation as the generator changes from no load to rated load.

The resultant A.C. sense voltage adjusted for cross current control and linearity control is full wave rectified in a rectifier 128 and filtered by an RLC circuit composed of a resistor 130, an inductor 132, a capacitor 134, and variable volts adjust resistors 136 or 138. Either the variable resistor 136 or the variable resistor 138 is selected by a switching unit 140 to adjust the amplitude of the resultant filtered sense voltage, which is now a D.C. voltage with a small A.C. ripple.

The output from the switching unit 140 is passed across a rectifier 142 and is then further altered by the secondary voltage developed across a control transformer secondary winding 144 connected across a variable resistor 146. The secondary winding 144 receives a secondary voltage from a primary winding 148 on the control transformer 28. It will be noted that this primary winding is connected between terminal 32 of the control transformer and a center point 150 in the split primary winding 40, and therefore the secondary voltage at the secondary winding 144 is ninety electrical degrees out-of-phase with the control voltage from the primary winding 40 which is developed across the secondary winding 42. The polarity is such that at the start of the positive going secondary voltage at the secondary winding 42 the superimposed voltage from the secondary winding 144 of the control transformer tends to add to the filtered sense voltage across the variable resistor 146, while at the end of the positive going secondary voltage cycle at the secondary winding 42, the superimposed voltage from the secondary winding 144 tends to subtract from the sense voltage. The purpose of the primary 148 and the secondary 144 is to provide a control voltage which is a positive link in the relationship between the control voltage at the secondary 42, the sense voltage developed from the secondary 110, and the power voltage, to be subsequently described, for field excitation.

The final adjusted sense voltage from the variable resistor 146 is developed across a base resistor 152 for the base 2 106 of the unijunction transistor 102. This unijunction transistor, with its associated circuitry, is the master firing unit of the firing circuit 22.

In the operation of the unijunction transistor 102, when the voltage between the emitter 100 and base 1 104, which is the reference voltage developed by the capacitor 96 and the Zener diode 98, is less than approximately .7 of the voltage between base 2 and base 1, the unijunction transistor will act as a tapped resistor with the greater percentage of resistance being from base 1 to the emitter. If, however, the reference voltage at the emitter exceeds this approximate .7 of the base 2 to base 1 voltage, the resistance between the emitter and base 1 becomes extremely low.

During steady state operation, the capacitor 96 charges quickly to the reference voltage level set by the Zener diode 98 as the control voltage at the secondary winding 42 of the control transformer passes through its positive going cycle. At the same time, base 2 of the unijunction transistor 102 is biased by the adjusted sense voltage with the superimposed control voltage from the secondary winding 144 of the transformer 28. During the beginning of the positive going cycle of the secondary voltage on the secondary winding 42, the secondary voltage from the secondary winding 148 will, as previously described, add to the sense voltage at base 2 of the unijunction transistor, and as the voltage at the emitter of the unijunction transistor is limited by the Zener diode 98, the emitter voltage cannot reach .7 of the base 2 voltage. However, as the output voltage cycle of the generator progresses and the secondary voltage across the secondary winding 144 decreases, the potential at the emitter of the unijunction transistor will reach .7 of the base 2 voltage and will allow a pulse of energy from the capacitor 96 to flow from the emitter to base 1. This pulse then flows as an output signal from base 1 to a primary winding 154 of a switching transformer.

It will be apparent that if the sense voltage developed from the secondary winding 110 indicates that the output voltage of the generator 12 is too high, the point at which the potential at the emitter of the unijunction transistor 102 reaches .7 of the voltage at base 2 will occur later in the output cycle, and thus the output signal furnished to the transformer primary 154 will occur late in the output cycle of the generator. Alternatively, an indication of a low output voltage from the generator 12 will cause the transformer primary 154 to received a pulse earlier in the generator output cycle.

The switching pulse from the primary winding 154 of the master firing circuit will operate to trigger an SCR switching unit for controlling the excitation of the generator excitation field winding in a manner to be subsequently described, but first, it will be beneficial to consider the first and second slave firing units of the firing circuit 22. The first slave firing circuit includes a unijunction transistor 156 and the second slave firing circuit includes a unijunction transistor 158, and as will subsequently become apparent, these slave firing circuits are substantially identical in circuit construction and are also quite similar to the master firing circuit.

Considering first the control circuitry for the unijunction transistor 156, it will be noted that this transistor is acted upon during voltage operation of the generator system by a control voltage developed across the secondary winding 44 by the primary winding 36 of the control transformer 28. As in the case of the master firing circuit, in instances where current control transformers are employed for current operation, the current secondaries 58 and 62 with resistors 160 and 162 operate to provide a control signal supplied from primary windings 52 and 54.

The secondary voltage from winding 44 is half wave rectified by rectifiers 164 and 166 and is combined with the half wave rectified control signal from the secondary winding 42 and the rectifiers 78 and 76 at the resistor 168. The combined voltage developed across the resistor 168 is applied as an anode potential to an SCR 170. The SCR circuit includes a gate to cathode resistor 172, and a secondary winding 174 and a series resistor 176 to provide a gate signal from the primary winding 154. Thus, when an output pulse is fed to the primary winding 154 by the unijunction transistor 102, a secondary voltage is developed across the secondary winding 174 and the resistor 176 to provide gate potential to the gate of the SCR 170. The SCR is now turned on and the anode to cathode current flow through the SCR operates a capacitor charging circuit to develop a firing potential at the emitter 178 of the unijunction transistor 156. At the same time, the flow through the SCR develops a biasing potential across a resistor 180 for base 2 182 of the unijunction transistor. The magnitude of the anode potential developed at the anode of the SCR is controlled by a Zener diode 184.

The capacitor charging circuit for building an emitter potential at the emitter of the unijunction transistor includes a resistor 186 in series with a variable resistor 188 and a capacitor 190, and a resistor 192 in shunt with this series circuit. The emitter junction of the unijunction transistor is connected between the variable resistor 188 and the capacitor 190.

In the operation of the capacitor charging circuit, when the SCR 170 conducts, the capacitor 190 begins to charge at a rate controlled by the variable resistor 188. The resistor 188 is preset so that the firing point of the unijunction transistor 156 will be reached 120 electrical degrees after the firing point of the unijunction transistor 102 is reached. When the capacitor 190 charges to a point sufficient to fire the unijunction transistor 156, a pulse passes from the emitter to base 1 thereof and then across a transformer primary winding 196 connected in series with base 1 of the transistor. Firing of the transistor causes an output pulse to be transmitted by the primary 196 120 electrical degrees after an output pulse is transmitted by the primary winding 154.

The second slave firing circuit including the unijunction transistor 158 is substantially identical in construction and operation to the first slave firing circuit, and therefore, for purposes of brevity, like elements in the second firing circuit diagram having like functions will be given the same reference numeral with the suffix a.

Briefly describing the operation of the second slave firing circuit, the control voltage for this firing circuit is developed by the secondary winding 46 from the primary winding 38 of the control transformer 28 during voltage operation of the generator. Again, if current transformers are employed, this control voltage is provided during current operation by the output from secondary windings 64 and 68 for current transformers having primary windings 54 and 56. The control voltage is half wave rectified by the rectifiers 164a and 166a and combined with the rectified control voltage from the secondary 44 across the resistor 168a to provide an anode potential for the SCR 170a of a magnitude determined by the Zener diode 184a.

The SCR 170a is fired by a gate pulse received by a secondary winding 198 from the primary winding 196 in the first slave circuit, and firing of the SCR causes an emitter potential to be developed by the capacitor 190a. A variable resistor 188a in series with the capacitor 190a is set to cause the capacitor to charge to the firing potential of the unijunction transistor 158 120 electrical degrees after the unijunction transistor 156 has fired. Upon firing of the unijunction transistor 158, a pulse is provided to a primary winding 200 in series with the base 1 194a of the unijunction transistor. Thus, the primary winding 200 of the second slave firing circuit is provided with a pulse 120 electrical degrees after a pulse is provided to the primary winding 196 of the first slave firing circuit and 240 electrical degrees after a pulse is provided to the primary winding 174 of the master firing circuit. It is therefore apparent that the point in the output cycle of the generator 12 at which the master firing vircuit provides an output pulse to the primary winding 174 is determined by the amplitude of the generator output voltage, and that the two slave firing circuits provide output pulses at a set phase differential thereafter.

Considering now the power control circuitry for generator field control which operates in response to the output firing signals from the firing circuit 22, it will be noted that the generator is provided with an excitation control field indicated generally at 202. Power to excite this control field is provided by the bus 18 through a power transformer having a delta connected primary 204 consisting of primary windings 206, 208 and 210 connected between terminal points 212, 214, and 216. The terminal point 212 is connected to the bus branch 18a, the terminal point 214 to the bus branch 18b, and the terminal point 216 to the bus branch 18c, so that the power transformer primaries are directly energized from the bus 18.

The excitation power from the primary 204 is received by delta connected secondary windings extending between terminal points 218, 220 and 222. These secondary windings include a winding 224 for the primary winding 206, a winding 226 for the primary winding 210, and a winding 228 for the primary winding 208. The excitation power from these secondary windings is passed to a three phase, full wave rectifier bridge consisting of power rectifiers 230, 232, 234, 236, 238 and 240.

The terminal point 218 for the delta connected secondary windings is connected to a bridge terminal between the power rectifiers 230 and 232, the secondary winding terminal point 222 is connected to a bridge terminal point between the power rectifiers 234 and 236, and the secondary winding terminal point 220 is connected to a bridge terminal point between the power rectifiers 238 and 240. In instances where power current transformers are included in the static exciter regulator system, the secondary windings for these power current transformers are connected in series between the delta connected secondaries and the rectifier bridge. Thus, a power current transformer secondary winding 242 is connected in series with the terminal point 218, a current transformer secondary winding 244 is connected in series with the terminal point 222, and a current transformer secondary winding 246 is connected in series with the terminal point 220. The primary windings for the current transformer secondary windings 242, 244 and 246 are connected in the input line 14 and include a primary winding 248 in branch 14a for the secondary winding 246, a primary winding 250 in branch 14b for the secondary winding 242, and a primary winding 252 in branch 14c for the secondary winding 244.

The three phase full wave rectified output of the rectifier bridge is fed as excitation power from the bridge through the switching circuit 24 to the excitation control field winding 202 for the generator. This excitation power is controlled within the switching circuit 24 by separate SCR switching units including SCR's 254, 256 and 258. It will be noted that anode potential is provided to these SCR's from each leg of the three-phase full wave rectifier bridge circuit by connections between the anode of the SCR 254 and the cathode of the power rectifier 230, the anode of the SCR 256 and the cathode of the power rectifier 234, and the anode of the SCR 258 and the cathode of the power rectifier 238.

Each of the SCR's 254, 256 and 258, respectively, is shunted by a resistor connected between the anode and cathode circuits thereof as indicated at 260, 262 and 264, respectively. Additionally, these resistors and the individual SCR's are shunted by a series RC network indicated respectively at 266, 268, and 270. The resistors 260, 262 and 264 are used to provide voltage sharing in the reverse blocking direction of the SCR's while the RC networks 266, 268 and 270 control the rate of voltage rise across the SCR's in the forward blocking state. Too rapid a rate of rise during the forward blocking state of an SCR can occur during shutoff in another leg of the three-phase rectifier bridge and can trigger on an individual SCR, thereby causing loss of regulation. The RC networks prevent this accidental triggering.

The firing of the SCR's is controlled by the master and first and second slave firing circuits previously described. A gate signal for the SCR's is provided by a transformer secondary winding 272 connected to the gate of the SCR 254, a transformer secondary winding 274 connected to the gate of the SCR 256, and a transformer secondary winding 276 connected to the gate of the SCR 258. The secondary winding 272 rceives a gate signal from the primary winding 154 in the master firing circuit, while the secondary winding 274 receives a gate signal from the primary winding 196 in the first slave firing circuit and the secondary winding 276 receives a gate signal from the primary winding 200 in the second slave firing circuit. Thus, it will be seen that gate pulses will be provided to fire the SCR's 254, 256, and 258 at 120 electrical degree phase differentials.

The three-phase full wave power rectifier bridge and the SCR firing circuit 24 are connected in shunt across the excitation control field winding 202, and upon the firing of each individual SCR, the output therefrom is provided as excitation power for the field winding. If the voltage regulator 20 causes the SCR's to fire early in the output voltage cycle of the generator 12, it will be apparent that increased field power will be provided to the field winding 202, and that such field power decreases the later the SCR's are caused to fire in the output cycle of the generator.

Also connected in shunt across the field excitation control winding 202 is a rectifier 278 and a resistor 280. The rectifier 278 is employed to carry generator field current during periods when the three-phase full wave rectifier bridge is in the off state as controlled by the SCR switching circuit 24. The resistor 280 is provided to carry holding current for the SCR's during start-up of the generator and also to absorb short energy bursts that may appear on the incoming line to the excitation control field winding so that high voltage transients will not appear across the semiconductors in the full wave rectifier bridge.

From the foregoing description, the operation of the novel static exciter regulator system 10 of the present invention to advance or retract the firing angle of the SCR switches 254, 256, and 258 in response to variations in the output voltage of the generator 12 will be apparent, and the operation of the circuit to maintain generator control during current operation of the generator 12 is substantially similar thereto. During current operation when the generator output is shorted or connected to a low impedance load, sufficient sense, power, and control voltages for the regulator 20 may not be present at the generator output 16 and the bus 18. When this condition exists, control of the generator is assumed by the current regulator 26 and control power is provided by the current transformers in the input line 14 for the generator.

Considering now in detail the operation of the static exciter regulator 10 during current operation, it will be noted that the current regulator 26 includes the current transformer secondary windings 60, 66, and 70. These secondary windings are shunted by resistors 282, 284, and 286, and with the generator in current operation, these winding circuits develop a secondary voltage signal received from the primaries 52, 54, and 56. This secondary voltage is rectified in a rectifier 288 and fed to an RC circuit which includes a capacitor 290 and a variable resistor 292. The charge on the capacitor 290 develops a voltage across the resistor 292 which is indicative of the current variations in the input line 14.

The voltage signal from the variable resistor 292 is fed via a rectifier 294, the variable resistor 146, and the resistor 152, to develop a base 2 bias on the unijunction transistor 102. This base 2 bias replaces the sense voltage previously described, and enables the unijunction transistor to continue operation in response to the voltage provided by the current regulator 26.

The reference voltage for the capacitor 96 and the emitter 100 of the unijunction transistor 102 is now developed from the current transformer secondaries 48 and 50 and the current transformer primaries 52 and 56 in the same manner that the reference voltage was previously developed from the secondary 42 of the control transformer 28. Thus, it will be seen that the transistor 102 is caused to fire during current operation in response to current variations on the input line 14.

Similarily to the master firing circuit, the first and second slave firing circuits develop a reference voltage at the anodes of the SCR's 170 and 170a from the current transformer secondary windings 58, 62, 64 and 68 rather than from the secondary windings 44 and 46 of the control transformer 28. In all other respects, however, the slave firing circuits operate in the manner previously described for voltage operation.

During current operation of the generator, the primary excitation power for the excitation control field winding 202 of the generator 12 is provided by the primary windings 248, 250, and 252 of the current transformers in the input line 14 to the secondary windings 242, 244 and 246. In all other respects, however, the SCR switching circuit 24 operates in the manner previously described to provide controlled three-phase excitation power to the excitation control field winding 202. It will, therefore, be noted that if the current in the input line 14 sensed by the current regulator 26 is too high, the master firing circuit will fire late in the input cycle to the generator and excitation power to the field winding 202 will be reduced. Conversely, an indication by the current regulator 26 of low input current in the input line 14 will increase the excitation power to the excitation control field winding.

It will be readily apparent to one skilled in the art that the present invention provides a novel and improved static exciter regulator for an A.C. generator which is capable of providing accurate generator control during both voltage and current operating conditions of the generator. The arrangements of types of components utilized within this invention may be subject to numerous modifications well within the purview of this inventor who intends only to be limited to a liberal interpretation of the specification and appended claims.

I claim:

1. An exciter regulator for a generator having an excitation field winding, input terminals and output terminals, comprising power circuit means connected to supply excitation power to said excitation field winding, a power control unit connected in said power circuit means, said power control unit including a plurality of intermittently conductive means connected to control the excitation of said excitation field winding, and regulator means operative to sense variations in the operative condition of said generator and to control the conduction of said intermittently conductive means in response to such variations, said regulator means including master firing means to initiate conduction of a first of said intermittently conductive means and to simultaneously provide a control signal, and slave firing means connected to receive said control signal from said master firing means, said slave firing means operating to initiate conduction of the remaining intermittently conductive means at predetermined intervals after the receipt of said control signal.

2. The exciter regulator of claim 1 wherein said intermittently conductive means control the excitation of said excitation field winding throughout each full cycle of an electrical quantity provided by said generator, said slave firing means including a first slave firing circuit means operating after receipt of said control signal to initiate conduction of a second intermittently conductive means and to provide a slave control signal to a second slave firing means, said second slave firing means operating to initiate conduction of a third of said intermittently conductive means at a predetermined time after the receipt thereby of said slave control signal.

3. The exciter regulator of claim 2 wherein said master and slave firing means operate to initiate the conduction of each said intermittently conductive means once during each cycle of generator output voltage, said slave firing means operating to fire said second intermittently conductive means 120 electrical degrees after the firing of said first intermittently conductive means and said second slave firing means operating to fire said third intermittently conductive means 120 electrical degrees after the firing of said second intermittently conductive means.

4. The exciter regulator of claim 3 wherein said regulator means includes reference circuit means to rapidly develop a reference voltage of a predetermined amplitude at the beginning of each output cycle of said generator output voltage, said reference circuit means being connected in circuit relation with said master firing means to apply said reference voltage thereto, and sense circuit means connected in circuit relationship with said generator output terminals and operative to produce a unidirectional voltage related to the output voltage of said generator, said sense circuit means including control voltage means operating to receive said unidirectional voltage and to superimpose thereon a varying control voltage to from a sense voltage for application by said sense circuit means to said master firing means, said control voltage being out of phase with said reference voltage so as to initially add to said unidirectional voltage to develop a sense voltage of greater amplitude than said reference voltage, said master firing means operating to initiate conduction of said first-intermittently conductive means and to provide said control signal when said sense voltage drops to a predetermined amplitude with respect to said reference voltage.

5. The exciter regulator of claim 1 wherein said regulator means is connected to control the conduction of said intermittently conductive means during current operation of said generator in response to current variations at the input terminals thereof, said regulator means including reference circuit means to rapidly develop a reference voltage of a predetermined amplitude, and sense circuit means operating to provide a sense voltage related to the current at the input terminals of said generator, said master firing means being connected to receive said reference and sense voltages and operating to initiate conduction of said first intermittently conductive means and to provide said control signal when said sense voltage reaches a predetermined amplitude with respect to said reference voltage.

6. The exciter regulator of claim 4 wherein said sense circuit means includes cross current correction means connected to said generator input to develop a cross current correction signal therefrom, said cross current correction means operating to receive said unidirectional voltage and to apply said cross current correction signal thereto to provide a first corrected unidirectional voltage, and linearity correction means connected to said generator input to develop a linearity correction signal therefrom, said linearity correction means operating to receive said first corrected unidirectional voltage from said cross current correction means and apply the linearity correction signal thereto to provide a second corrected unidirectional voltage, said control voltage means being connected to receive said second corrected unidirectional voltage.

7. The exciter regulator of claim 1 wherein said regulator means includes reference circuit means operative to rapidly develop a reference voltage of a predetermined amplitude and sense circuit means operative to provide a varying sense voltage related to the voltage at the output terminals of said generator, said master firing means including a unijunction transistor having first and second base electrodes and an emitter electrode, said reference circuit means being connected to apply said reference voltage to said emitter electrode, said sense circuit means being connected to apply said sense voltage to said first base electrode, and signal output means connected to said second base electrode to apply signals from said second base electrode to said first intermittently conductive means and slave firing means, said reference and sense voltages causing said unijunction transistor to provide an output signal to said output means when said sense voltage reaches a predetermined relationship with respect to said reference voltage.

8. The static exciter regulator of claim 7 wherein said slave firing means include first and second slave firing circuits, each of said slave firing circuits including reference circuit means to develop a reference signal, a semiconductor means, biasing circuit means connected to control the conduction of said semiconductor means, a controlled rectifier connected between said reference circuit means and said biasing circuit means to selectively apply said reference signal to said biasing circuit means, to subsequently cause conduction of said semiconductor means and output means connected to said semiconductor means to transmit a firing signal upon the conduction thereof, the controlled rectifier in said first slave firing circuit including gate circuit means to receive a rectifier firing signal from the output means of said master firing circuit and the controlled rectifier in said second slave firing circuit including gate circuit means to receive a rectifier firing signal from the output means of said first slave firing circuit.

9. The static exciter regulator of claim 8, wherein said intermittently conductive means include three controlled rectifiers connected to selectively provide excitation power from said power circuit means to said excitation field winding, a first of said controlled rectifiers having gate circuit means to receive a gate signal from the output of said master firing circuit, a second of said controlled rectifiers having a gate circuit means to receive a gate signal from the output of said first slave firing circuit, and the remaining controlled rectifier having a gate circuit means to receive a gate signal from the output of said second slave firing circuit.

10. The static exciter regulator of claim 9, wherein the biasing circuit means of said first slave firing circuit operates to initiate conduction of the semiconductor connected thereto 120 electrical degrees after the reception of a rectifier firing signal from said master firing circuit and the biasing circuit means of said second slave firing circuit operates to initiate the conduction of the the semiconductor connected thereto 120 electrical degrees after the reception of a rectifier firing signal from said first slave firing circuit.

11. A static exciter regulator for a three phase A.C. generator having a three phase power input line and a three phase output line, a three phase bus connected to said output line, and an excitation field winding comprising power circuit means connected to supply excitation power from said three phase bus to said excitation field winding, said power circuit means including a power transformer connected to said bus for providing a three phase output therefrom, a three phase full wave rectifier having rectifier legs connected to receive the output of said power transformer, a power control unit connected to said full wave rectifier to control the excitation of said excitation field winding, said power control unit including three intermittently conductive semiconductor means, each connected with a leg of said full wave rectifier across said excitation field winding, and regulator means connected to control the operation of said power control unit, said regulator means including a voltage regulator circuit means connected to operate during voltage operation of said generator to provide a varying sense voltage representative of the voltage on the output line of said generator and reference circuit means connected to receive a voltage from said three phase bus, said reference circuit means operating to rapidly develop a reference voltage of a predetermined amplitude at the beginning of each cycle of generator output voltage during voltage operation of said generator, a master firing circuit means electrically connected to receive said sense and reference voltages and provide a master firing signal to trigger the conduction of a first of said semiconductor means when said sense voltage reaches a predetermined amplitude with respect to said reference voltage, a first slave firing means connected to receive the master firing signal, said first slave firing means operating to provide a first slave firing signal to trigger the conduction of a second of said semiconductor means at a predetermined time after the receipt thereby of said master firing signal, and a second slave firing means connected to receive the first slave firing signal, said second slave firing means operating to provide a second slave firing signal to trigger conduction of a third of said semiconductor means at a predetermined time after the receipt thereby of said first slave firing signal.

12. The static exciter regulator of claim 11 wherein said voltage regulator circuit means includes means to produce a unidirectional voltage related to the output voltage on the output line of said generator and control voltage means operating to superimpose an alternating control voltage on said unidirectional voltage to form said varying sense voltage, said control voltage means including transformer means connected to said bus and operative to provide therefrom a control voltage ninety electrical degrees out of phase with the voltage received by said reference means from said bus.

References Cited

UNITED STATES PATENTS

| | | | |
|---|---|---|---|
| 3,211,987 | 10/1965 | Gatlin et al. | 322—28 X |
| 3,254,293 | 5/1966 | Steinbruegge et al. | 322—73 |
| 3,351,843 | 11/1967 | Tipton | 322—73 X |
| 3,364,416 | 1/1968 | Kirk et al. | 322—73 X |

ORIS L. RADER, *Primary Examiner.*

H. HUBERFELD, *Assistant Examiner.*

U.S. Cl. X.R.

322—28, 70, 73